Patented Dec. 17, 1940

2,225,358

UNITED STATES PATENT OFFICE 2,225,358

NITROSATION OF PHENOLIC MIXTURES

John W. Teter, Chicago, Ill., assignor to Sinclair Refining Company, New York, N. Y., a corporation of Maine No Drawing. Application June 12, 1937,
Serial No. 147,870

17 Claims. (Cl. 260—624)

This invention relates to the nitrosation of phenolic compounds and more particularly to the partial nitrosation of a mixture of phenolic compounds. In its more specific aspect, this invention contemplates the nitrosation of the most reactive phenolic compound or compounds in a mixture of phenolic compounds.

Nitroso phenolic compounds have been prepared heretofore by subjecting a phenolic compound to the action of nitrous acid. In general, this nitrosation has been effected by subjecting an alkaline solution of the phenolic compound such as phenol, for example, together with sodium nitrite to the action of a mineral acid, such, for example, as sulphuric acid. In such a process the phenol is dissolved in a solution of alkali such, for example, as sodium hydroxide with the resulting formation of sodium phenolate. To this solution of sodium phenolate is added an appropriate amount of sodium nitrite. Upon the addition of sulphuric acid to the solution the sulphuric acid reacts with the sodium nitrite to liberate nitrous acid. The nitrous acid thus liberated reacts with the sodium phenolate to produce the sodium salt of the nitroso phenol which simultaneously reacts with the sulphuric acid to yield the nitroso-phenol.

It is well known that nitrosation of phenolic compounds is a reaction which is affected to an unusual extent by slight variation in any one of the several factors that govern a successful preparation of the nitroso derivative. For example, the molal quantity of alkali nitrite should not exceed the molal quantity of phenolic compound being nitrosated. Only that amount of alkali nitrite should be used which will yield an amount of nitrous acid equivalent to the amount of phenolic compound being treated. If an excess of alkali nitrite is present to react with free acid, an excess of nitrous acid is produced over and above that amount of nitrous acid which will completely nitrosate the phenolic compound. Nitrous acid readily decomposes if present in a substantial excess to form nitric acid and nitric oxide, and the nitric acid reacts with the sodium nitrite to form more nitrous acid. Hence, there is a serious depletion of the nitrite which results in a low yield and a highly impure product. Secondly, an excess of nitrous acid forms a diazonium salt with the uncrystallized nitroso phenolic compound and a further excess of nitrous acid acts as a reducing agent on the diazonium salt to produce by-products which appear as impurities in the nitroso derivative of the phenolic compound.

It is known that a low temperature must be maintained throughout the entire reaction. Nitrous acid is extremely unstable at temperatures above approximately 32° F. As noted above, the nitric acid formed as a result of decomposition of nitrous acid seriously impairs the yield of the nitroso phenolic compound.

Thorough mechanical agitation is also necessary during the entire reaction period. Inasmuch as the reaction between the phenolic compound and nitrous acid is exothermic, vigorous stirring is necessary to prevent local overheating within the reaction solution which tends to decompose free nitrous acid. Inasmuch as nitrous acid, as well as being unstable at temperatures in excess of about 32° F., is also unstable in high concentrations even at lower temperatures, vigorous agitation is necessary to insure against any local high concentration of nitrous acid.

Due to the fact that the reaction between the phenolic compound and nitrous acid is not ionic but is organic, the rate of the nitrosation reaction must be very slow to prevent the existence at any time of a high concentration of free nitrous acid or an excess of mineral acid. As pointed out above, a high concentration of nitrous acid tends to cause decomposition thereof. Furthermore, the nitroso derivatives tautomerize in an acid medium and the tautomeric form is readily oxidized. For this reason, therefore, it is desirable to insure against the presence of excess acid in the reaction solution. By carefully controlling the rate at which the mineral acid is added to the reaction solution together with thorough agitation, the rate of formation of nitrous acid may be directly controlled and the alkalinity of the reaction solution may be maintained.

It is also well known that further care must be taken in controlling the concentration of the phenolic compound being nitrosated. If the compound is present in excess of the optimum concentration the resulting nitroso phenol is of poor quality and the yield is adversely affected.

In my copending application Serial No. 147,869 I have pointed out that even when all of these well known factors have been carefully controlled the resulting nitroso phenolic compound nevertheless is often of unsatisfactory purity. By carefully controlling these and other factors heretofore unknown but described in the above-identified copending application, a nitroso phenolic compound of high degree of purity may be readily and consistently obtained.

For example, in spite of all precautions taken there is a tendency for the nitrous acid to decompose in the reaction solution, particularly toward the end of the reaction period. The nitric oxide produced by this decomposition rapidly combines with free oxygen in the atmosphere above the solution to form nitrogen peroxide. The nitrogen peroxide rapidly oxidizes the nitroso phenolic compound to form impurities. Furthermore, the period of crystallization of the nitroso derivative from the reaction solution accompanied by thorough agitation must also be taken into consideration. If the mechanical agitation of the reaction solution is stopped within a short time after all of the mineral acid has been added to the reaction solution, the nitroso derivative which crystallizes out of the solution is of poor quality. Hence, a substantial period of crystallization with thorough agitation is necessary.

Finally, the pH value of the final solution from which the nitroso derivative of the phenolic compound is crystallized has a marked effect upon the purity of the crystallized nitroso derivative.

As also described in my copending application identified above, I have discovered that if the factors heretofore known to influence the nitrosation reaction are carefully controlled and that if, in addition, the nitrogenous fumes are swept out of the reaction chamber, if agitation of the solution is maintained during crystallization of the nitroso phenolic compound from the reaction solution, and if the pH value of the final reaction solution is properly controlled, individual phenolic compounds may be nitrosated so as to obtain consistently high yields of the pure nitroso derivatives.

The removal of the nitrogenous fumes from the reaction chamber may be accomplished by sweeping the atmosphere above the reaction solution with a gas which is inert with respect to the reaction solution. The reaction chamber may be swept with advantage with nitrogen, air, carbon dioxide, or other similarly inert gas. The rate at which the inert gas is passed through the upper portion of the reaction chamber need be only such as to insure prompt removal of nitrogenous fumes from the atmosphere above the reaction solution.

Agitation of the reaction solution should be maintained for a substantial period after addition of the mineral acid to the phenolic solution has been completed. The nitroso phenolic compound does not crystallize immediately from the reaction solution but requires a considerable length of time for this crystallization. The agitation of the reaction solution is continued with advantage throughout substantially the entire crystallization period. In the now preferred embodiment of my invention the period of crystallization accompanied by thorough agitation of the reaction solution should be at least one half the length of time required for the controlled addition of mineral acid to the phenolic solution.

The acid or basic character of the reaction solution from which the nitroso derivative is crystallized should be carefully controlled. The pH of the final reaction solution should be adjusted to substantially that of a solution of the pure nitroso phenolic compound; a pH value substantially above or below that of the pure nitroso derivative tends to discolor the nitroso derivative with impurities during crystallization of the final product from the reaction solution. I have found that the pH value of carbonic acid closely approximates that of a solution of most pure nitroso phenolic compounds. By neutralizing excess acid in the final reaction solution by adding thereto a small quantity of an alkali such, for example, as sodium hydroxide and by subsequently passing gaseous carbon dioxide through the reaction solution to slightly acidify the solution, the pH of the solution from which the nitroso derivative is crystallized is adjusted to the optimum value.

I have found, however, that complete nitrosation of a mixture of phenolic compounds can not be satisfactorily carried out even when each of the factors enumerated above is controlled during the nitrosation of the mixture. When complete nitrosation of a mixture of phenolic compounds is attempted a gummy or oily liquid is obtained. This resulting product is characterized by large quantities of impurities and a marked tendency toward decomposition. The liquid or gummy character of the nitrosated product may be attributed to the fact that many of the nitroso derivatives have such a low melting point that their separation in a solid state is prohibited under ordinary conditions. The presence of substantial quantities of impurities and the tendency for the product to decompose appears to be due to the fact that the nitrosation of phenolic compounds preferably occurs in the para position. Some of the phenolic compounds in the mixture of unreacted compounds are difficult if not virtually impossible to nitrosate for the reason that such compounds may not have the para position open for nitrosation. If the para position is not open and the ortho position is nitrosated, there is a strong tendency for the nitroso derivative to tautomerize with the production of undesirable decomposition products.

I have discovered that by partially nitrosating a mixture of phenolic compounds substantially complete nitrosation of certain phenolic compounds may be produced without impurities resulting from the attempted nitrosation of other phenolic compounds not readily amenable to nitrosation. By partially nitrosating the most reactive phenolic compound or compounds in a mixture of the compounds by subjecting the mixture to the action of an amount of nitrous acid sufficient to nitrosate only the most reactive compound in the mixture, a product of high purity may be obtained which contains substantially only nitroso derivatives dissolved in unreacted phenolic compounds.

Although the degree of nitrosation depends largely upon the specific phenolic compounds present in the mixture, I have found that a satisfactory product may be generally obtained by subjecting the mixture of phenolic compounds to the action of about 25 to 75% of the total theoretical amount of nitrous acid required to completely nitrosate the entire mixture. The theoretical amount of nitrous acid required to completely nitrosate the mixture may be readily ascertained by a determination of the actual phenolic compounds which constitute the mixture and the assumption that each of the individual compounds in the mixture may be completely nitrosated. By "completely nitrosated" as used herein I mean that substantially each molecule of the individual compounds in the mixture is provided with at least one substituted nitroso group. The following table shows the optimum amount of nitrous acid which should be formed during nitrosation of a mixture of phenolic compounds (cresol, xylenols, etc.) comprising a coal-tar acid having a boiling range between 200 to 216° C. This mixture of coal-tar acids having the above characteristics will be referred to hereinafter as "lower xylenols."

Table

| Percent of NaNO₂ | Yield: observed theoretical |
|---|---|
| | Percent |
| 25 | 51.0 |
| 40 | 60.7 |
| 50 | 46.3 |
| 60 | 41.6 |
| 75 | 46.0 |
| 100 | 25.3 |

Inasmuch as the quantity of sodium nitrite is a direct measure of the amount of nitrous acid formed during the nitrosation reaction, it is apparent from the foregoing tabulation that most satisfactory results are to be obtained by subjecting the "lower xylenols" mixture to the action of approximately 40% of the total theoretical amount of nitrous acid required for complete nitrosation of the mixture. While the most desirable yield is obtained by the use of only 40% of the sodium nitrite theoretically required for complete nitrosation, it is obvious that such a reduction in the amount of sodium nitrite required greatly reduces the cost of preparation of the mixture containing one or more nitroso derivatives.

The process of my invention will be more readily understood by consideration of the following example in which a "lower xylenol" mixture is partially nitrosated. For purposes of simplicity, the quantities of reagents used are expressed in molal concentration.

*Example*

1.0 mol of sodium hydroxide is dissolved in 1800 c. c. of water, and to this solution 1.0 mol (118 grams) of a "lower xylenol" mixture is added. After the mixture of phenolic compounds has been completely dissolved, preferably with thorough agitation, 0.4 mol of sodium nitrite is dissolved in the solution. The solution is then cooled to approximately 28° F. and this temperature is maintained with advantage throughout the entire reaction and crystallization periods. 0.7 mol (1.4 equivalents) of sulphuric acid is then diluted with water to a total volume of approximately 200 c. c. Of the 1.4 equivalents of sulphuric acid necessary, one equivalent is used to neutralize the sodium hydroxide and the remaining 0.4 equivalent is required to neutralize the sodium nitrite. This solution of sulphuric acid is cooled to at least room temperature and preferably to about 28° F. The dilute acid is then added to the cold reaction solution at such a rate that it requires approximately 1.0 hour to add the 200 c. c. of acid. Thorough agitation must be maintained throughout the entire reaction period, and care should be taken that the temperature of the reaction solution does not rise substantially above 28° F. After approximately 180 c. c. of the dilute sulphuric acid have been added to the reaction solution, nitrogen or air is passed through the upper portion of the reaction chamber in order to sweep from the atmosphere above the reaction solution any nitrogen dioxide fumes which may be formed. The nitrogen or air is passed through the reaction chamber with advantage until all of the dilute sulphuric acid has been added to the reaction solution. After all of the acid has been added, 0.01 mol of sodium hydroxide dissolved in about 10 c. c. of water is added to the reaction solution, and then carbon dioxide is passed slowly through the reaction solution for about fifteen minutes during which period agitation is maintained. The resulting slightly acidic solution is then decanted from the brown oily product obtained.

The oily product separated from the reaction solution may be further purified by completely dissolving the liquid in a suitable solvent such as benzene and washing the benzene solution with cold water about three times with separation of the benzene solution from the water after each washing. A quantity of anhydrous sodium sulphate, for example, sufficient to thoroughly dry the benzene solution is added to the solution followed by decantation of the benzene solution from the solid material. The benzene may be removed from the solution containing unreacted phenolic compounds and nitroso derivatives by distillation at approximately 200° F. but not substantially above this temperature. The final product comprises a viscous oil containing about 23 to 25% on a molar basis of 4-nitroso-2-ethyl phenol dissolved in unreacted cresols and xylenols originally present in the "lower xylenol" mixture.

The mixture of nitroso derivative or derivatives dissolved in unreacted phenolic compounds as obtained by the process of my invention is of extremely high purity. Furthermore, the product is stable and shows no tendency toward decomposition. The marked stability of the nitroso derivatives thus produced is due to a large extent to the fact that the nitroso derivatives are dissolved in unreacted phenolic compounds. The unreacted phenolic compounds protect the nitroso derivatives from oxidation. The stability of the final product may be also attributable to the fact that only stable nitroso derivatives are produced upon partial nitrosation of the mixture of phenolic compounds used as a source of raw material. Those nitroso derivatives which are produced have substantially no tendency to tautomerize.

It will be seen, therefore, that by the use of the process of my invention a mixture of phenolic compounds may be nitrosated to produce a final product which comprises stable nitroso derivatives of phenolic compounds dissolved in unreacted phenolic compounds. The process entails the supervision of certain factors each of which is easily controlled. The process requires a minimum of costly reagents and is particularly applicable to the nitrosation of inexpensive phenolic mixtures such as coal-tar acid and the like.

I claim:

1. In the nitrosation of a mixture of phenolic compounds having a boiling point range between about 200 to 216° C., the improvement which comprises subjecting the mixture to the action of approximately 40 percent of the theoretical amount of nitrous acid required to nitrosate all components of the mixture of phenolic compounds.

2. In the nitrosation of a mixture of coal-tar acids having a boiling point range between about 200 to 216° C. and containing o-ethyl-phenol, the improvement which comprises subjecting the mixture of coal-tar acids to the action of an amount of nitrous acid sufficient completely to nitrosate the o-ethyl-phenol but insufficient completely to nitrosate the entire mixture of coal-tar acids.

3. The method of producing a solution of nitroso phenolic compounds in unreacted phenolic compounds which comprises subjecting a mixture of unreacted phenolic compounds to the action of a nitrosating agent in amount insufficient to nitrosate all components of the entire mixture but sufficient completely to nitrosate the most reactive phenolic compounds in the mixture so that there is obtained one or more nitroso phenolic compounds dissolved in the unreacted phenolic compounds which have not been nitrosated.

4. In the method of producing a solution of nitroso phenolic compounds in unreacted phenolic compounds the improvement which comprises subjecting a mixture of unreacted phenolic compounds to the action of about 40 percent of the total theoretical amount of nitrous acid required to nitrosate all components of the mixture whereby the most reactive phenolic compounds in the mixture are nitrosated to produce a mixture of nitroso phenolic compounds dissolved in the unreacted phenolic compounds which have not been nitrosated.

5. The method of nitrosating a mixture containing phenolic compounds at least one of which is higher than cresol which comprises subjecting the mixture to the action of a nitrosating agent in amount insufficient to nitrosate all components of the entire mixture.

6. The method of nitrosating a phenolic compound higher than cresol contained in a mixture of phenolic compounds which comprises subjecting the mixture to the action of a nitrosating agent in amount insufficient to nitrosate all components of the entire mixture but sufficient to nitrosate at least a portion of said higher phenolic compound.

7. The method of nitrosating a phenolic compound higher than cresol contained in a mixture of phenolic compounds which comprises subjecting the mixture to the action of nitrous acid in amount insufficient to nitrosate all components of the entire mixture but sufficient to nitrosate at least a portion of said higher phenolic compound.

8. In the nitrosation of a mixture of phenolic compounds containing at least one phenolic compound higher than cresol, the improvement which comprises subjecting the mixture to the action of about 25 to 75 percent of the theoretical amount of nitrous acid required to nitrosate all components of the entire mixture of phenolic compounds.

9. The method of nitrosating a mixture containing phenolic compounds at least one of which is higher than cresol which comprises subjecting the mixture to the action of a nitrosating agent in amount insufficient to nitrosate all components of the entire mixture but sufficient to nitrosate at least a portion of said phenolic compounds higher than cresol.

10. In the nitrosation of a mixture of monohydric phenols having a boiling point range between about 200° to 216° C., the improvement which comprises subjecting the mixture to the action of approximately 40 percent of the theoretical amount of nitrous acid required to nitrosate all components of the mixture of phenolic compounds.

11. The method of producing a solution of nitroso phenols in unreacted phenols which comprises subjecting a mixture of unreacted phenols of the group consisting of phenol, cresols, xylenols and coal tar acids boiling between 200 and 216° C., to the action of a nitrosating agent in amount insufficient to nitrosate all components of the entire mixture but sufficient to nitrosate the most reactive phenols in the mixture so that there is obtained at least one nitroso phenol dissolved in the unreacted phenols which have not been nitrosated.

12. In the method of producing a solution of nitroso phenols in unreacted phenols, the improvement which comprises subjecting a mixture of unreacted phenols of the group consisting of phenol, cresols, xylenols and coal tar acids boiling between 200 and 216° C., to the action of about 40 percent of the total theoretical amount of nitrous acid required to nitrosate all components of the mixture whereby the most reactive phenols in the mixture are nitrosated to produce a mixture of nitroso phenols dissolved in the unreacted phenols which have not been nitrosated.

13. The method of nitrosating a mixture containing phenols of the group consisting of phenol, cresols, xylenols and coal tar acids boiling between 200 and 216° C., at least one of which is higher than cresol, which comprises subjecting the mixture to the action of a nitrosating agent in amount insufficient to nitrosate all components of the entire mixture.

14. The method of nitrosating a phenol higher than cresol contained in a mixture of phenols of the group consisting of phenol, cresols, xylenols and coal tar acids boiling between 200 and 216° C., which comprises subjecting the mixture to the action of a nitrosating agent in amount insufficient to nitrosate all components of the entire mixture but sufficient to nitrosate at least a portion of said higher phenol.

15. The method of nitrosating a phenol higher than cresol contained in a mixture of phenols of the group consisting of phenol, cresols, xylenols and coal tar acids boiling between 200 and 216° C., which comprises subjecting the mixture to the action of nitrous acid in amount insufficient to nitrosate all components of the entire mixture but sufficient to nitrosate at least a portion of said higher phenol.

16. In the nitrosation of a mixture of phenols of the group consisting of phenol, cresols, xylenols and coal tar acids boiling between 200 and 216° C., and containing at least one phenol higher than cresol, the improvement which comprises subjecting the mixture to the action of about 25 to 75 percent of the theoretical amount of nitrous acid required to nitrosate all components of the entire mixture of phenols.

17. The method of nitrosating a mixture containing phenols of the group consisting of phenol, cresols, xylenols and coal tar acids boiling between 200 and 216° C., at least one of which is higher than cresol, which comprises subjecting the mixture to the action of a nitrosating agent in amount insufficient to nitrosate all components of the entire mixture but sufficient to nitrosate at least a portion of said phenols higher than cresol.

JOHN W. TETER.